United States Patent [19]

Lajoie

[11] 3,996,958

[45] Dec. 14, 1976

[54] HYDRAULIC VALVE ASPIRATOR

[75] Inventor: Pierre A. Lajoie, Grand Falls, Canada

[73] Assignee: Lajoie Enterprises Ltd., Canada

[22] Filed: July 21, 1975

[21] Appl. No.: 597,902

[30] Foreign Application Priority Data

Apr. 4, 1975 Canada .............................. 223827

[52] U.S. Cl. ................................ 137/312; 137/604

[51] Int. Cl.[2] ........................................ F16K 51/00

[58] Field of Search .................. 137/312, 604, 114

[56] References Cited

UNITED STATES PATENTS

| | | | |
|---|---|---|---|
| 323,404 | 8/1885 | Durfee | 137/312 X |
| 2,486,087 | 10/1949 | Wright | 137/312 X |
| 2,562,415 | 7/1951 | Chase | 137/604 X |
| 2,899,971 | 8/1959 | Munter | 137/604 X |
| 2,934,090 | 4/1960 | Kenann et al. | 137/312 X |
| 3,516,445 | 6/1970 | Skeates | 37/312 X |

*Primary Examiner*—William R. Cline
*Assistant Examiner*—Richard Gerard
*Attorney, Agent, or Firm*—Cushman, Darby & Cushman

[57] ABSTRACT

An aspirator device is placed in an hydraulic circuit that incorporates one or more hydraulically actuated solenoid valves. The aspirator comprises a cylindrical body having a through bore for the passage of pressurized oil therethrough and a branch bore, in communication with the main bore, connected to the pilot drain of the valve. The pressurized passage of the oil in the through bore causes a negative pressure at the branch bore and the pilot drain.

1 Claim, 2 Drawing Figures

HYDRAULIC VALVE ASPIRATOR

This invention relates to hydraulic circuits and in particular to means for applying a negative pressure to the pilot drain of a solenoid valve used in such circuits.

In the field of heavy mechanical vehicles such as back-hoes, logging machines and the like, hydraulic circuitry is used to actuate shovels, blades, cutting shears and such mechanical devices. For example, a pair of log gripping arms will be mounted at the terminal ends of a boom which is pivotally mounted at its inner end to the vehicle platform. The gripping arms are actuated by hydraulic cylinders which are part of a hydraulic circuit that also includes a pump, solenoid valves and an oil tank as well as a control stick or suitable control means for the valve or valves and thereby the cylinders. Typically, most of the above integers of the hydraulic system will be mounted on the vehicle platform and will be connected to the gripping arm operating cylinders by hoses or lines extending from the control cab to the operating end of the boom.

One reason for positioning the system integers, and particularly the solenoid valves, on the vehicle platform is that hydraulically-operated solenoid valves are sensitive to variations in orientation. If such a valve is turned sideways, for example, there is a possibility that oil in the pilot drain will accidentally actuate the valve, the result of which could be dangerous. In accordance with the present invention means are provided for applying a negative pressure or vacuum to the pilot drain of the valve so that the valves may thereby be oriented in any direction. In this manner, the complete hydraulic system may be mounted on the operative head of the machine concerned, a more desirable and efficient arrangement in that the hydraulic communication lines can be removed from the boom and substantially reduced in numbers.

In accordance with a broad aspect the present invention relates to a means for applying a negative pressure to a pilot drain of an hydraulically operated solenoid valve comprising an aspirator adapted to be connected in a hydraulic circuit with said valve and intermediate the valve and an oil tank, said aspirator having a through bore for the passage of oil therethrough under pressure from the cylinder exhaust to the oil tank, and a branch bore angularly disposed from and communicating with the through bore and being directed in the downstream direction thereof, the branch bore being adapted for connection with the pilot drain hole whereby oil passing through the through bore of the aspirator effects a negative pressure on the branch bore and the pilot drain.

Figure 1:
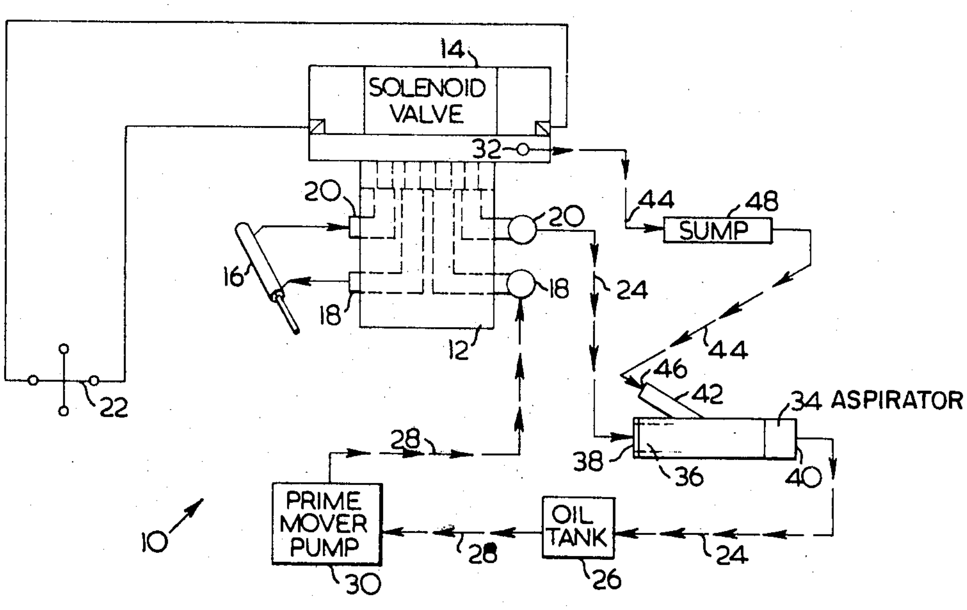
Figure 2:
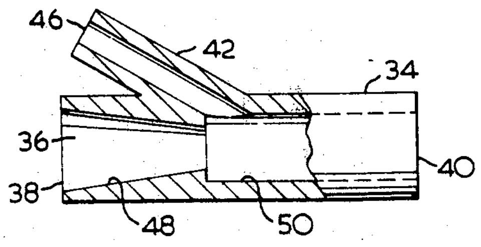

The invention is illustrated by way of example in the accompanying drawings wherein:

FIG. 1 is a schematic view of an hydraulic circuit incorporating the invention, and FIG. 2 is an elevation view, partly in section, of the aspirator means.

In the schematic diagram of FIG. 1, only one solenoid valve is shown. However, it will be appreciated that the aspirator can be used with as many valves as required, as long as the appropriate number of inlets are added to the sump.

The circuit shown generally at 10 includes a manifold 12 governed by a solenoid valve 14, the manifold 12 delivering and receiving operating fluid to an hydraulic ram 16 by means of an inlet conduit 18 and exhaust 20. The actuation of the valve 14, which in turn governs the flow direction through the manifold 12, is controlled by a joy stick or similar device 22 as shown.

The exhaust conduit 20 leads to an oil tank 26 by way of an exhaust line 24, while a feed line 28 provides the prime mover pump 30 with oil for the inlet conduit 18.

The solenoid valve is provided with a pilot drain hole 32 for removal of any system fluid that may leak past the piston in the valve. If this fluid is not constantly removed, accidental actuation of the valve can take place with possibly dangerous results. If the valve 14 is always oriented so that the pilot drain 32 is in the lower end of the unit, there is generally no problem. However, the valve cannot be moved around to a position where the pilot 32 will not drain by gravity.

In order to provide this flexibility in valve installation and operation, the present invention provides means for applying a negative pressure to the pilot drain 32 so that it can operate in any orientation. Thus, an aspirator device 34 is positioned in the exhaust line 24 and, as shown in FIG. 2, comprises a through bore 36 for the passage therethrough of exhaust oil travelling from the manifold 12 to the oil tank 26. The inlet and outlet of the aspirator 34 may more correctly be referred to as the upstream end 38 and the downstream end 40.

The aspirator 34 is provided with a branch bore 42 that is in communication with the through bore 36 and which is angularly disposed in relation thereto and directed in the downstream direction thereof. A pilot drain line 44 extends from the pilot drain hole 32 to the inlet 46 of the branch bore 42 and a sump 48 is positioned in this line as shown in FIG. 1.

The construction of the aspirator 34 is shown in detail in FIG. 2. The upstream end 38 has a frusto-conical wall 48 leading into the cylindrical walls 50 of the through bore 36. It will be noted that the branch bore 42 enters the through bore 36 at the terminal end of the frusto-conical portion 48 or immediately downstream thereof.

Moreover, the diameter of the bore 36 is substantially greater than the frusto-conical portion 48.

In operation, fluid being exhausted in the line 24 enters the aspirator 34 at the upstream end 38 due to the narrowing constriction of the frusto-conical wall 48, a head is built up in the fluid and, as it enters the cylindrical section of the bore 36 it has a "jet" effect, causing a drawing or vacuum on the branch bore 42. This action effectively siphons off any residual oil in the pilot drain 32 and sump 48.

It will be appreciated that with the subject matter of the present invention in an hydraulic circuit, the solenoid valves and other elements can be mounted remote from the operating cab of the machine in a compact, more efficient system.

While the invention has been described in connection with a specific embodiment thereof and in a specific use, various modifications thereof will occur to those skilled in the art without departing from the spirit and scope of the invention as set forth in the appended claim.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

For example, the invention is useful in agriculture, forestry and construction equipment; marine fluid power systems, snow removal and cleaning equipment etc. The hydraulic circuitry can be used, therefor, in fluid power systems to prevent malfunction of directional pressure and flow control due to high back pressure in the fluid circuit.

I claim:

1. In an hydraulic circuit including a solenoid valve having a pilot drain for fluid leakage, an apparatus for applying a negative pressure to said pilot drain comprising an aspirator adapted to be connected in said hydraulic circuit with said valve and intermediate the valve and an oil tank, said aspirator having a main, through bore for the passage of oil therethrough under pressure from a cylinder exhaust to the oil tank, and a branch bore angularly disposed from and communicating with the main, through bore and being directed to the downstream direction thereof; and wherein the through bore has an upstream inlet and a downstream outlet, said upstream inlet end being of frusto-conical configuration towards the downstream end and terminating intermediate the ends of the aspirator at the wider, cylindrical walls of the main, through bore; the branch bore communicating with the through bore downstream of the frusto-conical portion.

* * * * *